(12) United States Patent
Kummetz et al.

(10) Patent No.: US 9,755,868 B2
(45) Date of Patent: * Sep. 5, 2017

(54) SYSTEMS AND METHODS FOR TRANSPORTING DIGITAL RF SIGNALS

(71) Applicant: CommScope Technologies LLC, Hickory, NC (US)

(72) Inventors: Thomas Kummetz, Kissing (DE); Van E. Hanson, Forest, VA (US); Christopher Goodman Ranson, Concord, VA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/269,677

(22) Filed: Sep. 19, 2016

(65) Prior Publication Data

US 2017/0012805 A1   Jan. 12, 2017

Related U.S. Application Data

(63) Continuation of application No. 14/816,231, filed on Aug. 3, 2015, now Pat. No. 9,450,653, which is a
(Continued)

(51) Int. Cl.
*H04L 27/00* (2006.01)
*H04L 25/05* (2006.01)
(Continued)

(52) U.S. Cl.
CPC .......... *H04L 27/0002* (2013.01); *H04B 7/04* (2013.01); *H04L 25/05* (2013.01); *H04L 27/28* (2013.01); *H04W 88/085* (2013.01)

(58) Field of Classification Search
CPC combination set(s) only.
See application file for complete search history.

(56) References Cited

U.S. PATENT DOCUMENTS 5,339,184 A   8/1994   Tang
5,627,879 A   5/1997   Russell et al.
(Continued)

FOREIGN PATENT DOCUMENTS

EP   1148653   10/2001
JP   2010062856   3/2010
(Continued)

OTHER PUBLICATIONS

European Patent Office, "Office Action for EP Application No. 11776295.5", "from Foreign Counterpart to U.S. Appl. No. 13/814,459", May 27, 2016, pp. 1 30, Published in: EP.
(Continued)

*Primary Examiner* — Kabir A Timory
(74) *Attorney, Agent, or Firm* — Fogg & Powers LLC

(57) ABSTRACT

A telecommunications system is provided that can re-sample a digitized signal at a resample rate that is based on one or more factors to better utilize bandwidth. The factors can include the bandwidth of the signal that the digitized signal represents, the amount of bandwidth owned or used by the carrier, the full bandwidth of the designated RF band, the bandwidth of the serial link, the frame length of the serial link, the segmentation of the frames on the serial link, and the capability of the equipment at the receiving end of a serial link. The re-sampled signal can be transmitted to another unit that is remote to the unit transmitting the signal. The other unit can include a re-sampling device that restores the re-sampled signal to a digital signal that can be converted to an analog signal for wireless transmission.

20 Claims, 9 Drawing Sheets

Related U.S. Application Data continuation of application No. 13/814,459, filed as application No. PCT/US2011/056809 on Oct. 19, 2011, now Pat. No. 9,130,609.

(60) Provisional application No. 61/394,462, filed on Oct. 19, 2010.

(51) Int. Cl.
*H04L 27/28* (2006.01)
*H04B 7/04* (2017.01)
*H04W 88/08* (2009.01)

(56) References Cited

U.S. PATENT DOCUMENTS

| | | | |
|---|---|---|---|
| 5,818,883 | A | 10/1998 | Smith et al. |
| 6,137,826 | A | 10/2000 | Boesch |
| 6,697,603 | B1 | 2/2004 | Lovinggood et al. |
| 7,433,708 | B2 | 10/2008 | Rinne et al. |
| 7,532,684 | B2 | 5/2009 | Tietjen |
| 7,554,946 | B2 | 6/2009 | Conyers et al. |
| 7,565,170 | B2 | 7/2009 | Buscaglia et al. |
| 7,610,046 | B2 | 10/2009 | Wala |
| 7,639,982 | B2 | 12/2009 | Wala |
| 7,640,019 | B2 | 12/2009 | Conyers et al. |
| 7,756,208 | B2 | 7/2010 | Bykovnikov |
| 7,848,747 | B2 | 12/2010 | Wala |
| 8,270,387 | B2 | 9/2012 | Cannon et al. |
| RE44,398 | E | 7/2013 | Conyers et al. |
| 8,682,338 | B2 | 3/2014 | Lemson et al. |
| 8,948,155 | B2 | 2/2015 | Cannon et al. |
| 2002/0061012 | A1 | 5/2002 | Thi et al. |
| 2004/0196168 | A1 | 10/2004 | Ho et al. |
| 2005/0238060 | A1 | 10/2005 | Kuntz et al. |
| 2006/0120497 | A1* | 6/2006 | Blasco Claret ..... H03M 1/0836 375/355 |
| 2006/0198477 | A1 | 9/2006 | Moorti et al. |
| 2008/0240225 | A1 | 10/2008 | Zavadsky et al. |
| 2010/0002724 | A1 | 1/2010 | Turlington et al. |
| 2010/0046641 | A1 | 2/2010 | Wala |
| 2010/0061291 | A1 | 3/2010 | Wala |
| 2010/0177760 | A1 | 7/2010 | Cannon et al. |
| 2011/0158081 | A1 | 6/2011 | Wang et al. |
| 2012/0051407 | A1* | 3/2012 | Ji ..................... H03H 17/0642 375/219 |
| 2012/0069880 | A1 | 3/2012 | Lemson et al. |
| 2013/0136202 | A1 | 5/2013 | Kummetz et al. |
| 2014/0010168 | A1 | 1/2014 | Stapleton et al. |

FOREIGN PATENT DOCUMENTS

| | | |
|---|---|---|
| WO | 2009151893 | 12/2009 |
| WO | 2010126667 | 11/2010 |
| WO | 2011071870 | 6/2011 |
| WO | 2012054553 | 4/2012 |

OTHER PUBLICATIONS

U.S. Patent Office, "Final Office Action", "from U.S. Appl. No. 13/814,459", Mar. 6, 2015, pp. 114, Published in: US.

U.S. Patent Office, "Notice of Allowance", "from U.S. Appl. No. 13/814,459", Apr. 29, 2015, pp. 117, Published in: US.

U.S. Patent Office, "Office Action", "from U.S. Appl. No. 13/814,459", Jul. 30, 2014, pp. 115, Published in: US.

U.S. Patent Office, "Final Office Action", "from U.S. Appl. No. 14/816,231", Feb. 10, 2016, pp. 118, Published in: US.

U.S. Patent Office, "Notice of Allowance", "from U.S. Appl. No. 14/816,231", May 18, 2016, pp. 112, Published in: US.

U.S. Patent Office, "Corrected Notice of Allowability", "from U.S. Appl. No. 14/816,231", Jul. 26, 2016, pp. 1-6, Published in: US.

U.S. Patent Office, "Office Action", "from U.S. Appl. No. 14/816,231", Sep. 10, 2015, pp. 118, Published in: US.

International Search Authority, "International Preliminarty Report on Patentability for PCT/US2011/056809", "from Foreign Counterpart to U.S. Appl. No. 13/814,459", Apr. 23, 2013, pp. 112, Published in: WO.

International Search Authority, "International Search Report from PCT Application No. PCT/US2011/056809", "from Foreign Counterpart to U.S. Appl. No. 13/814,459", Feb. 12, 2012, pp. 116, Published in: WO.

European Patent Office, "Office Action for EP Application No. 11776295.5", "from Foreign Counterpart to U.S. Appl. No. 13/814,459", dated Jun. 23, 2017, pp. 1-5, Published in: EP.

\* cited by examiner

| N | Occupied Bandwidth (MHz) | Resample Rate (MHz) | No. of Complex Samples | No. of Bits Required | No. of Octets per Sample | No. of Octets |
|---|---|---|---|---|---|---|
| 1 | 5 | 6.667 | 8 | 14 | 1.75 | 28.00 |
| 2 | 10 | 13.333 | 16 | 14 | 1.75 | 56.00 |
| 3 | 15 | 20.000 | 24 | 14 | 1.75 | 84.00 |
| 4 | 20 | 26.667 | 32 | 14 | 1.75 | 112.00 |
| 5 | 25 | 33.333 | 40 | 14 | 1.75 | 140.00 |
| 6 | 30 | 40.000 | 48 | 14 | 1.75 | 168.00 |
| 7 | 35 | 46.667 | 56 | 14 | 1.75 | 196.00 |
| 8 | 40 | 53.333 | 64 | 12 | 1.50 | 192.00 |
| 9 | 45 | 60.000 | 72 | 12 | 1.50 | 216.00 |
| 10 | 50 | 66.667 | 80 | 12 | 1.50 | 240.00 |
| 11 | 55 | 73.333 | 88 | 12 | 1.50 | 264.00 |
| 12 | 60 | 80.000 | 96 | 12 | 1.50 | 288.00 |
| 13 | 65 | 86.667 | 104 | 12 | 1.50 | 312.00 |
| 14 | 70 | 93.333 | 112 | 12 | 1.50 | 336.00 |
| 15 | 75 | 100.000 | 120 | 12 | 1.50 | 360.00 |

FIG. 4

| Description | No. of Octets |
|---|---|
| Preamble | 7 |
| SFD | 1 |
| Destination Address | 6 |
| Source Address | 6 |
| Length | 2 |
| Frame Check Sequence | 4 |
| Interpacket Gap | 12 |
| Available for Payload<br><br>• Control Ethernet (100 Mb)<br>• 1 Gb Link<br>• RF Payload<br>• Overhead | 1462<br><br>15<br><br>150<br>1297<br>38 |

FIG. 6

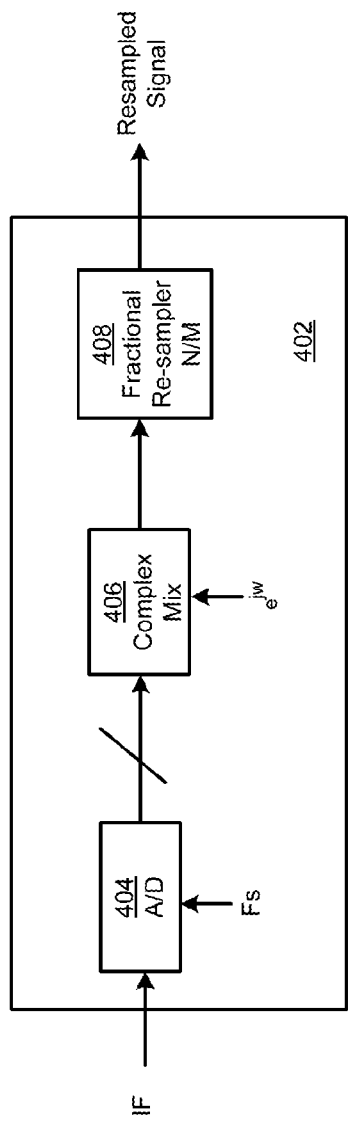
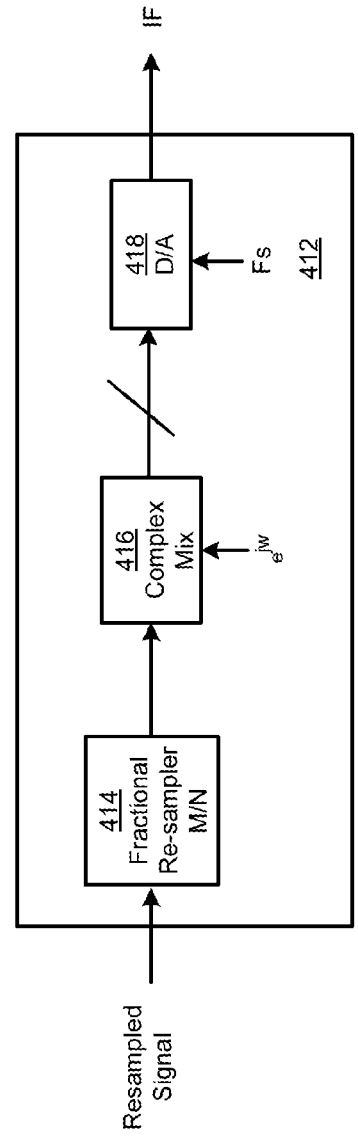
FIG. 8A
FIG. 8B

SYSTEMS AND METHODS FOR TRANSPORTING DIGITAL RF SIGNALS

CROSS-REFERENCE TO RELATED APPLICATIONS

This is a continuation of U.S. patent application Ser. No. 14/816,231 filed Aug. 3, 2015 and entitled "SYSTEMS AND METHODS FOR TRANSPORTING DIGITAL RF SIGNALS", which is a continuation of U.S. patent application Ser. No. 13/814,459 filed Feb. 5, 2013 and entitled "SYSTEMS AND METHODS FOR TRANSPORTING DIGITAL RF SIGNALS", which is the U.S. national phase of International Application No. PCT/US2011/056809 filed on Oct. 19, 2011 and entitled "SYSTEMS AND METHODS FOR TRANSPORTING DIGITAL RF SIGNALS", which application claims priority to U.S. Provisional Application No. 61/394,462, filed Oct. 19, 2010 and titled "SYSTEMS AND METHODS FOR TRANSPORTING DIGITAL RF SIGNALS", the entirety of each of which are incorporated herein by reference.

TECHNICAL FIELD OF THE DISCLOSURE

The present invention relates generally to telecommunications and more particularly (although not necessarily exclusively) to efficiently transporting digital RF in a distributed communications system.

BACKGROUND

A communications system can include a distributed system capable of transporting signals between carriers and user devices, such as mobile devices. An example of a distributed system is a distributed antenna system that includes one or more master units in communication with carrier systems, such as base transceiver stations of cellular service providers. The distributed antenna system can include remote antenna units physically separated from the master unit, but in communication with the master unit via a serial link that may be copper, optical, or other suitable communication medium. The remote antenna units can also be in wireless communication with user devices. For example, the remote antenna units may be positioned in a building, tunnel, or other structure that prevents or limits communications directly with the carriers.

The master unit can facilitate communication between the carrier systems and the remote antenna units. For example, the master unit can down-convert and digitize via an analog-to-digital converter (A/D) signals received from the carriers and can multiplex the signals into frames that are transmitted over the serial link to the remote antenna units. A signal may be one or more channels having a composite analog or digital waveform with a bandwidth that can be up to the full bandwidth of a designated telecommunication band. Examples of telecommunication bands include US Cellular, SMR800, AWS700, SMR900, EGSM900, DCS1800, PCS1900, and UMTS2100. The remote antenna units can include a digital-to-analog converter (D/A) to convert the signals to analog signals. The remote antenna units can frequency shift the analog signals to a frequency for transmission to the user devices. Communications from the user device can be similarly processed and transmitted. For example, a remote antenna unit can digitize and package the signals into frames that are transmitted via the serial link to the master unit. The master unit can convert the digital signals to analog signals at a frequency for transmission to the appropriate carrier.

The master unit can transmit several bands of signals via the serial link to the remote antenna system for distribution to various user devices. The bands of signals can be digitized using a common sample rate. The serial link, however, has a finite amount of bandwidth (e.g. 10 Gbps) available for transferring digitized signals between the master unit and the remote antenna system. Because the bands are sampled at a common sample rate (including those bands having lower bandwidth requirements), serial link bandwidth is underutilized. Accordingly, it is desirable to utilize serial link bandwidth more efficiently.

One technique to utilize serial link bandwidth more efficiently includes selecting optimal A/D and D/A sample rates for each band to be transported. For example, the master unit can include a plurality of A/Ds. Each A/D is associated with a sample rate provided by a sample clock. The sample rate for an A/D can be selected to accommodate the band of the respective signals being converted by the A/D. The corresponding D/A can use the same sample rate provided by a sample clock at the remote antenna units. The result is that the master unit transports just the required amount of bandwidth for each band at the serial bit rate of the serial link.

Implementing this technique, however, can be problematic. Generating different sample rates for A/Ds (or for D/As) can be expensive. It can also be difficult to accomplish using hardware. For example, the sample rates must be programmable, requiring low noise frequency synthesizers that can both increase costs and cause performance degradation based on phase noise introduced into the system. Furthermore, this technique requires that the front-end systems that include the A/Ds or D/As be specially manufactured or configured, limiting the ease of manufacturing and replacing these components. In addition, an anti-aliasing filter must be used that is programmable according to the bandwidth to prevent aliasing. Such programmable analog anti-aliasing filters preceding the A/D converter can be difficult to design and configure and can be expensive. Problems may also arise in interfacing with carriers due, for example, to the unavailability of an A/D using an appropriate sample rate for the bandwidth of the analog signals from a particular carrier.

Therefore, systems and methods are desirable that can utilize serial link bandwidth efficiently without requiring different sample rates for A/Ds or D/As.

SUMMARY

In an embodiment, a distributed antenna system is provided. The distributed antenna system includes a master unit and a remote unit. The master unit includes an analog-to-digital converter (A/D) and a re-sampling device. The A/D can use a sample rate to convert a downlink RF signal to a digital downlink signal. The re-sampling device can output a re-sampled digital downlink signal by re-sampling the digital downlink signal at a resample rate that is different than the sample rate and that is based on at least one factor. The master unit can provide the re-sampled digital downlink signal to a communication medium. The remote unit includes a second re-sampling device and a digital-to-analog converter (D/A). The second re-sampling device can resample the re-sampled digital downlink signal at a second resample rate that is reciprocal to the resample rate to output the digital downlink signal. The D/A can convert the digital downlink signal to the downlink RF signal.

In another embodiment, a wireless telecommunications signal distribution system is provided that includes A/Ds and re-sampling devices. The A/Ds can convert signals using a common sample rate to digital signals corresponding to the signals. The re-sampling devices can output re-sampled signals. Each re-sampling device can resample a digital signal at a resample rate that is different than the common sample rate and that is based on a bandwidth associated with at least one of a component of the system, an input signal, or a carrier in communication with the system.

In another embodiment, a system is provided that includes an interface device and a re-sampling device. The interface device can provide a previously sampled digital signal to the re-sampling device. The re-sampling device can output a re-sampled digital signal by re-sampling the previously sampled digital signal using a resample rate that is based on a bandwidth associated with at least one of a component of the system, a signal represented by the previously sampled digital signal, or a carrier in communication with the system.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Features of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF THE DRAWINGS

FIG. 4 includes a table of resample rate examples according to one embodiment of the present invention.

FIG. 6 includes a table of frame structure fields and corresponding octets according to one embodiment of the present invention.

FIG. 8A is a block diagram of an integrated device having an analog-to-digital converter (A/D), mixer, and re-sampling device disposed therein according to one embodiment of the present invention.

FIG. 8B is a block diagram of an integrated device having a re-sampling device, a mixer, and a digital-to-analog converter (D/A) disposed therein according to one embodiment of the present invention.

DETAILED DESCRIPTION

Figure 1:
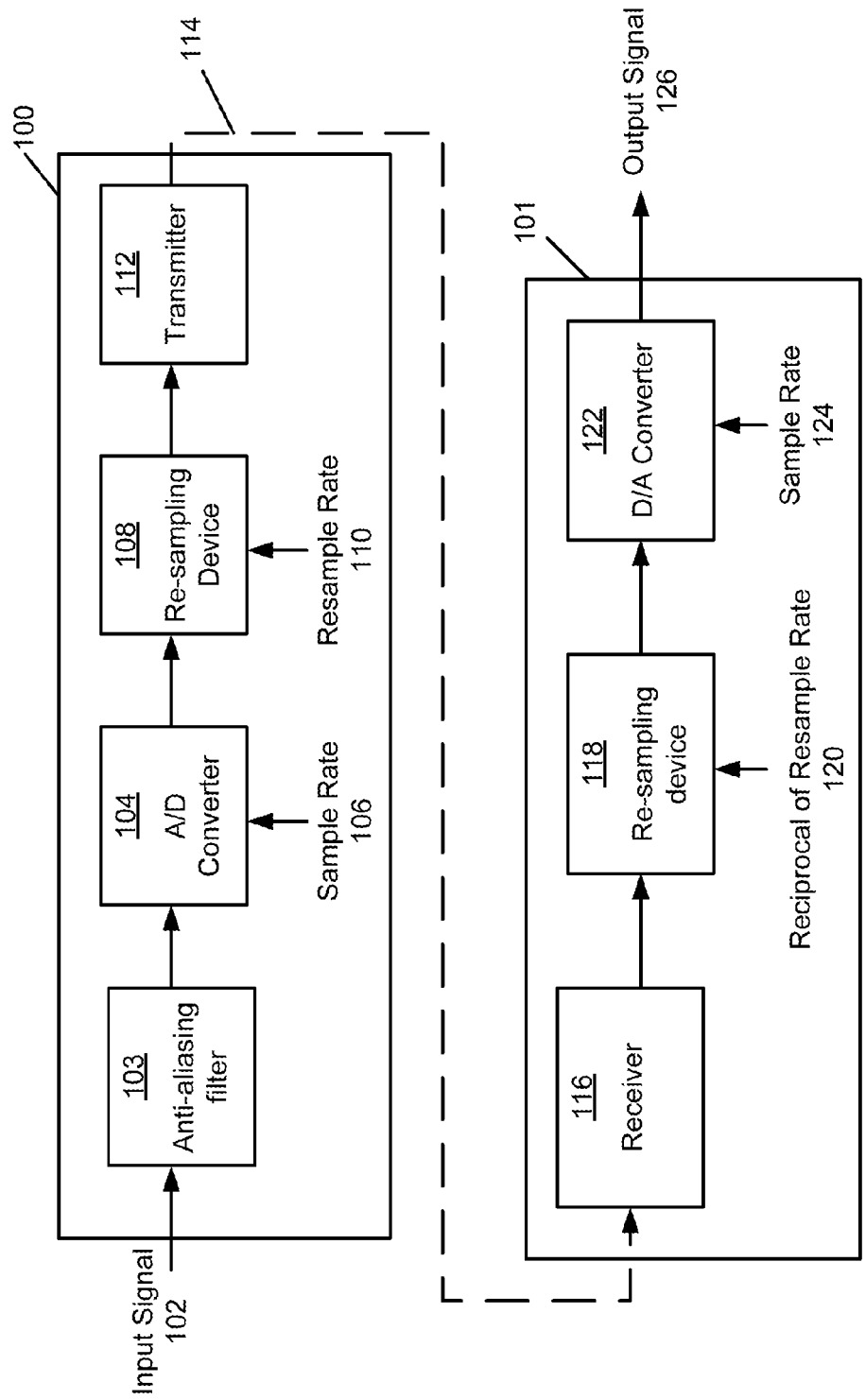
FIG. 1 is a block diagram of a communication system having re-sampling devices according to one embodiment of the present invention.

Certain aspects and features relate to re-sampling a digitized signal at a resample rate that is selected based on one or more factors—a "flex-banding" approach. The factors can include the bandwidth of the input signal that the digitized signal represents, the amount of bandwidth owned or used by the carrier that is the source of the input signal, the full bandwidth of the designated RF band, the bandwidth of the serial link, the frame length of the serial link, the segmentation of the frames on the serial link, and the capability of the equipment at the receiving end of a serial link. The re-sampled signal can be multiplexed and transmitted on the serial link to another unit that is remote to the unit transmitting the signal. The other unit can include a re-sampling device capable of restoring the re-sampled signal to a digital signal that can be converted to an analog signal by a digital-to-analog converter (D/A). By re-sampling the digitized signal at the selected resample rate, the bandwidth of the serial link can be better utilized without requiring an analog-to-digital converter (A/D) or a D/A to be specially configured. For example, certain embodiments can allow digitized signals to be transported at or as close as possible to a minimal sampling rate needed for the relevant RF band(s).

In some embodiments, a master unit is provided that is in communication with various telecommunication network operators which are referred to herein as carriers, such as cellular service providers. The master unit can process composite input signals from the various carriers by converting the input signals to digital signals using a common sample rate and re-sampling each digital signal at a resample rate that is selected based on one or more factors, such as the bandwidth of the particular input signal that the digital signal represents. In other embodiments, the master unit can receive previously sampled signals as digital signals from one or more carriers and re-sample the previously sampled signals at the resample rate. The re-sampled signals can be transmitted to a remote unit that can process the re-sampled signals to generate analog signals corresponding to the input signals. The analog signals can be transmitted wirelessly (or otherwise) to remote devices, such as mobile devices. This can be referred to as a "downlink path." An "uplink path" can include similar processing of signals from the remote devices for receipt by a respective carrier, except the remote units include circuitry or modules capable of re-sampling a digital representation of each signal at a selected resample rate for each signal and the master unit is capable of processing the re-sampled signals to generate analog signals corresponding to the signals from the remote devices, or to generate digital signals corresponding to the signals from the remote devices.

A "re-sampling device" may be a device that receives a digital signal that is sampled at a certain sample rate and outputs a digital signal that is sampled at a different sample rate. A sample rate can be changed using any rational relationship between an input sample rate and an output sample rate, as shown by the following relationship: $F_{out}=F_{in}*I/D$. "I" and "D" can be any integer, including one. When "D" is one, a re-sampling device may effectively be an interpolator. When "I" is one, a re-sampling device may effectively be a decimator.

Decimation can be performed by first filtering the digital signal to prevent aliasing when the lower sample rate is applied. The filter parameters can be selected to prevent aliasing that may result from the down-sampling operation. Aliasing may not be completely prevented, but the filter stop-band can be selected such that acceptably low level of aliasing occurs due to down-sampling the signal. In some implementations, the filter is selected to have a stop-band that starts at a frequency of $\omega_{stop}=\pi/D$ radians/second.

An interpolator can first insert I-1 zeroes between incoming samples. As a result, images of the original spectrum can occur every 2 $\pi$/I radians/second. In some implementations, the filter that follows the up-sampling has a $\omega_{stop}=\pi/I$ radians/second.

In some implementations, fractional rate changes of I/D can be performed. In these implementations, the process of interpolation and decimation can be combined to produce a rate change that is $F_{in}*I/D$. The interpolation filter and the decimation filter can be combined to form a single filter. The stop-band of the filter can be selected to be $\omega_{stop}=\min\{\pi/D, \pi/I\}$ radians/second.

These illustrative examples are given to introduce the reader to the general subject matter discussed here and are not intended to limit the scope of the disclosed concepts. The following sections describe various additional embodiments and examples with reference to the drawings in which like numerals indicate like elements, and directional descriptions are used to describe the illustrative embodiments but, like the illustrative embodiments, should not be used to limit the present invention.

FIG. 1 depicts a downlink path from a master unit 100 to a remote unit 101 according to one embodiment. An input signal 102, such as a signal from a carrier, is received. The input signal 102 can be associated with a bandwidth that may depend on the bandwidth that the carrier owns or has configured the carrier system to utilize. The master unit 100 includes an analog interface, such as an anti-aliasing filter 103 that is capable of filtering the input signal 102 and an A/D converter 104 that is capable of converting the input signal 102 to a digital signal by sampling the input signal 102 at a sample rate 106. In some embodiments, as explained below, the interface device also includes an RF front-end. The sample rate 106 can be a common sample rate that is used to convert signals from carriers generally. In other embodiments, the interface device is a digital interface that is configured to receive a previously sampled signal as a digital input signal. For example, the digital interface may replace the anti-aliasing filter 103 and A/D converter 104 in FIG. 1.

The digital signal is re-sampled by a re-sampling device 108 at a resample rate 110 that is selected based on one or more factors that can include the bandwidth associated with the input signal 102 and/or the bandwidth that the carrier owns. Other factors include the bandwidth of a communication medium 114 between the master unit 100 and remote unit, and the capability of the remote unit 101. For example, the resample rate 110 may be different if the communication medium 114 has a 10 Gbps bandwidth as opposed to one with a bandwidth of 1 Gbps. The resample rate 110 can be generated and configured using hardware, software, or a combination of hardware and software. For example, the master unit 100 can include an application-specific integrated circuit (ASIC), a field-programmable gate array (FPGA), a digital signal processor (DSP), or similar device that is capable of outputting and/or generating the resample rate 110 based on the one or more factors. In some embodiments, the resample rate 110 is configured manually or remotely based on the bandwidth of the input signal 102 at location of the master unit 100. In other embodiments, the resample rate 110 is selected dynamically or automatically based on the one or more factors. The resample rate 110 may be lower than the sample rate 106 such that the bandwidth of the re-sampled signal is less than the digital signal. The re-sampled signal can be transmitted by a transmitter 112 over the communication medium 114 to the remote unit 101. The communication medium 114 may be any medium capable of carrying the re-sample signal to the remote unit 101. In some embodiments, the communication medium 114 is a serial link. Examples of communication medium 114 include a copper or optical cable and a microwave link. The communication medium 114 may include a downlink cable and an uplink cable that is separate from the downlink cable.

The remote unit 101 can include a receiver 116 that can detect the re-sampled signal from the communication medium 114. The receiver 116 can provide the re-sampled signal to a re-sampling device 118 that can use a rate that is related to the resample rate 120, such as a reciprocal of the resample rate 120 to output a digital signal that corresponds to the digital signal outputted by the A/D converter 104. In some embodiments, the reciprocal of the resample rate 120 is the inverse of the resample rate 110. In other embodiments, the reciprocal of the resample rate 120 is not the inverse of the resample rate 110 and instead is a rate that has a relationship to the resample rate 120. The remote unit 101 can include a D/A converter 122 that can use a sample rate 124 to convert the digital signal to an output signal 126 that corresponds to, or represents, the input signal 102. The output signal 126 can be transmitted to a remote device, such as a mobile device, by the remote unit 101. For example, the remote unit 101 may be a remote antenna unit that is capable of wirelessly communicating with a mobile device. In some embodiments, the remote unit 101 includes an analog interpolating filter and an RF back-end that are capable of processing the analog signal prior to transmission.

Although only a downlink path is depicted in FIG. 1, various embodiments contemplate a bidirectional communication system, such as a system that also includes an uplink path. For example, the remote unit 101 can receive signals from remote devices, convert them to a digital representation, re-sample the signals and transmit re-sampled signals via communication medium 114, or a second communication medium, to the master unit 100 and the master unit 100 can process the re-sampled signals to output corresponding signals, analog or digital, to the carrier.

The master unit 100 can include additional components capable of receiving more than one input signal from one or more carriers and transmitting a digital representation of the input signals to the remote unit 101 for distribution to various remote devices. In some embodiments, the master unit 100 is configured to resample one digital signal corresponding to one input signal and transmit the re-sampled digital signal with digital signals corresponding to other input signals. The remote unit 101 can include components capable of processing the re-sampled digital signal and the digital signals. Re-sampling one digital signal, for example, can decrease the amount of bandwidth required to transmit the re-sampled digital signal with the other digital signals that are not re-sampled. In other embodiments, the master unit 100 includes components capable of re-sampling digital signals representing various input signals such that the required bandwidth is decreased even more. The remote unit 101 can include components capable of processing the re-sampled digital signals.

Figure 2A:
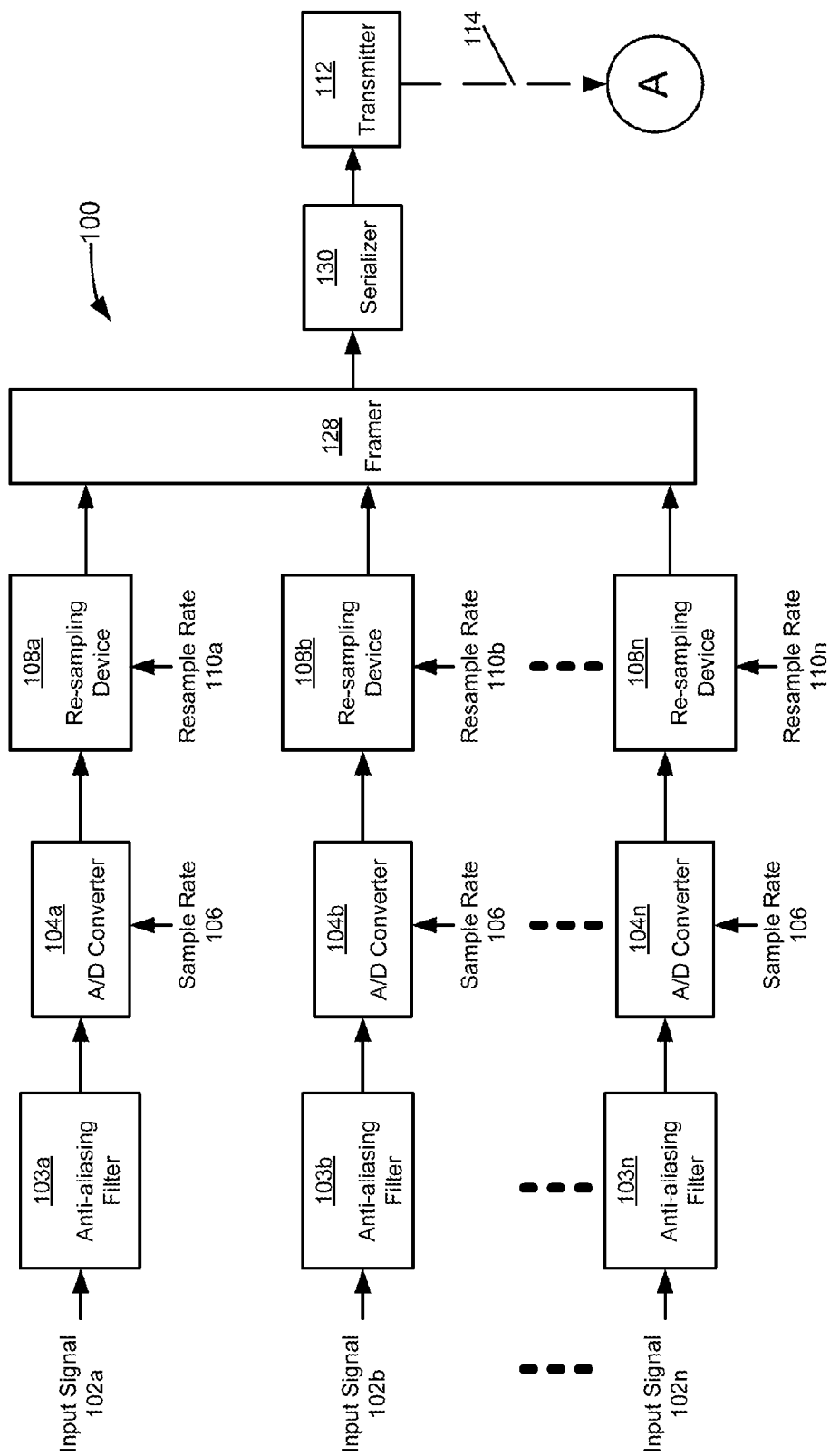
FIG. 2A is a block diagram of a master unit capable of communicating data from input signals via a serial link according to one embodiment of the present invention.
Figure 2B:
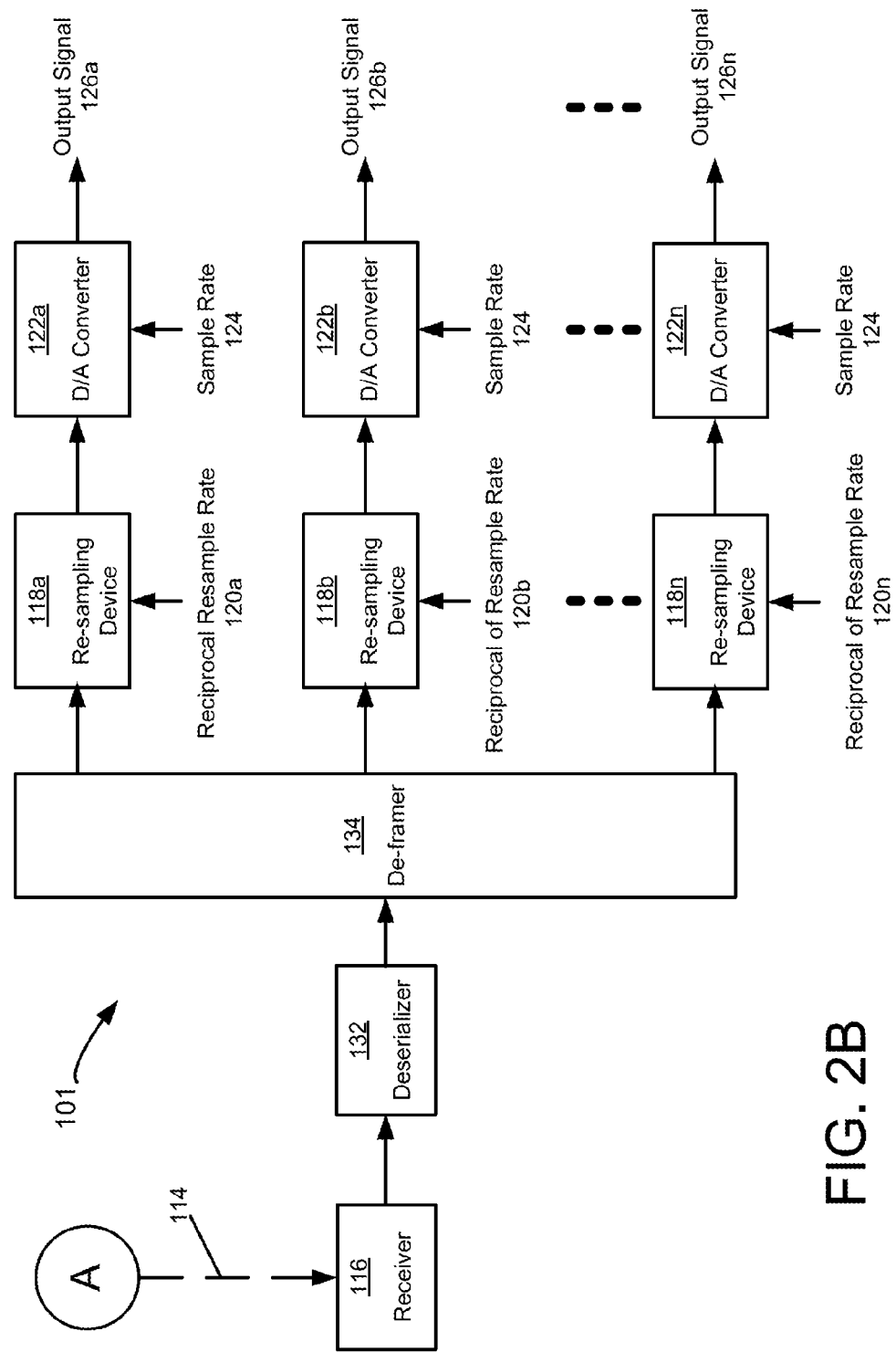
FIG. 2B is a block diagram of a remote unit capable of receiving digital signals representing the input signals from the master unit of FIG. 2A via the serial link according to one embodiment of the present invention.

FIG. 2A depicts an example of the master unit 100 that includes additional components for re-sampling digital signals representing input signals 102a-n from various sources or carriers. The input signals 102a-n may be associated with different bandwidths, such as the bandwidths of the input signals 102a-n and/or the bandwidths owned by the carriers. The master unit 100 can transmit the re-sampled digital signals to the remote unit 101 that is depicted in FIG. 2B.

The master unit 100 includes anti-aliasing filters 103a-n that are capable of filtering input signals 102a-n. The master unit 100 also includes A/D converters 104a-n, each being capable of converting an input signal to a digital signal at a common sample rate 106. For example, A/D converter 104a converts input signal 102a to a digital signal and A/D converter 104b converts input signal 102b to a second digital signal. In other embodiments, one or more of both anti-aliasing filters 103a-n and A/D converters 104-a-n are replaced with a digital interface that can receive a previously sampled signal as an input digital signal. The master unit 100 includes re-sampling devices 108a-n, each being capable of re-sampling a digital signal at a resample rate 110a-n that is selected based on one or more factors, such as the bandwidth of the input signal that the particular digital signal represents. For example, re-sampling device 108a is capable of re-sampling the digital signal from A/D converter 104a at a resample rate 110a that can depend on the bandwidth of the input signal 102a. Re-sampling device 108b can resample the digital signal from A/D converter 104b at a resample rate 110b that can depend on the bandwidth of the input signal 102b and that may be different than the resample rate 110a. The output of the re-sampling devices 108a-n includes re-sampled signals that may have been re-sampled at different resample rates and, thus, can have different bandwidths.

The master unit 100 can include a framer 128 that, as explained in more detail below, can multiplex the re-sampled digital signals and create a frame that includes the re-sampled signals from one or more of the re-sampling devices 108a-n disposed in the frame. The framed data can be serialized by the serializer 130 and provided to the transmitter 112 for output on the communication medium 114 to the remote unit 101, as shown by the circled A in FIGS. 2A-B. For example, the communication medium 114 may be an optical fiber (single mode or multi-mode) and the transmitter 112 can be capable of translating the serialized data into a coded light pulses that form a serial bit stream and of using an injection-laser diode, or other suitable light source, to generate light pulses that are, using suitable optical lenses, provided to the optical fiber. By re-sampling the digital signals at flexible re-sampling rates, the bandwidth of the communication medium 114 can be better utilized.

The remote unit 101 includes a receiver 116 that can detect the serialized data from communication medium 114. For example, the receiver 116 can include a light sensitive component capable of detecting the light pulses from a communication medium 114 that is an optical fiber, and can include a translation component capable of translating the light pulses to serial frame data represented digitally. The serial frame data can be provided to a deserializer 132. The deserializer 132 can convert the serial frame data to parallel frame data that is provided to de-framer 134. The de-framer 134 can de-multiplex the parallel frame data and extract each of the re-sampled digital signals. In some embodiments, a jitter buffer is positioned between the deserializer 132 and de-framer 134, such as where communication medium 114 allows for asynchronous serial transport.

The re-sampled digital signals can be provided to re-sampling devices 118a-n such that a re-sampled digital signal is provided to the appropriate re-sampling device. Each of the re-sampling devices 118a-n can use corresponding reciprocals of the resample rates 120a-n, or otherwise rates related to the resample rates 120a-n, to convert the re-sampled digital signals to digital signals, such as complex digital signals at baseband. For example, re-sampling device 118a can use a reciprocal of the resample rate 120a that is the reciprocal of resample rate 110a to convert a re-sampled digital signal to a real or complex digital signal at baseband that represents input signal 102a. Similarly, reciprocal of the resample rate 120b can correspond to resample rate 110b and can be used to output a real or complex digital signal at baseband that represents input signal 102b.

The digital signals can be provided to D/A converters 122a-n such that a digital signal is provided to the appropriate D/A converter. The D/A converters 122a-n convert the digital signals using sample rate 124 and up-convert the signals to an appropriate frequency for modulation onto analog output signals 126a-n. In some embodiments, the sample rate 124 is the same rate as sample rate 106. In other embodiments, the sample rate 124 is different than the sample rate 106.

Figure 3A:
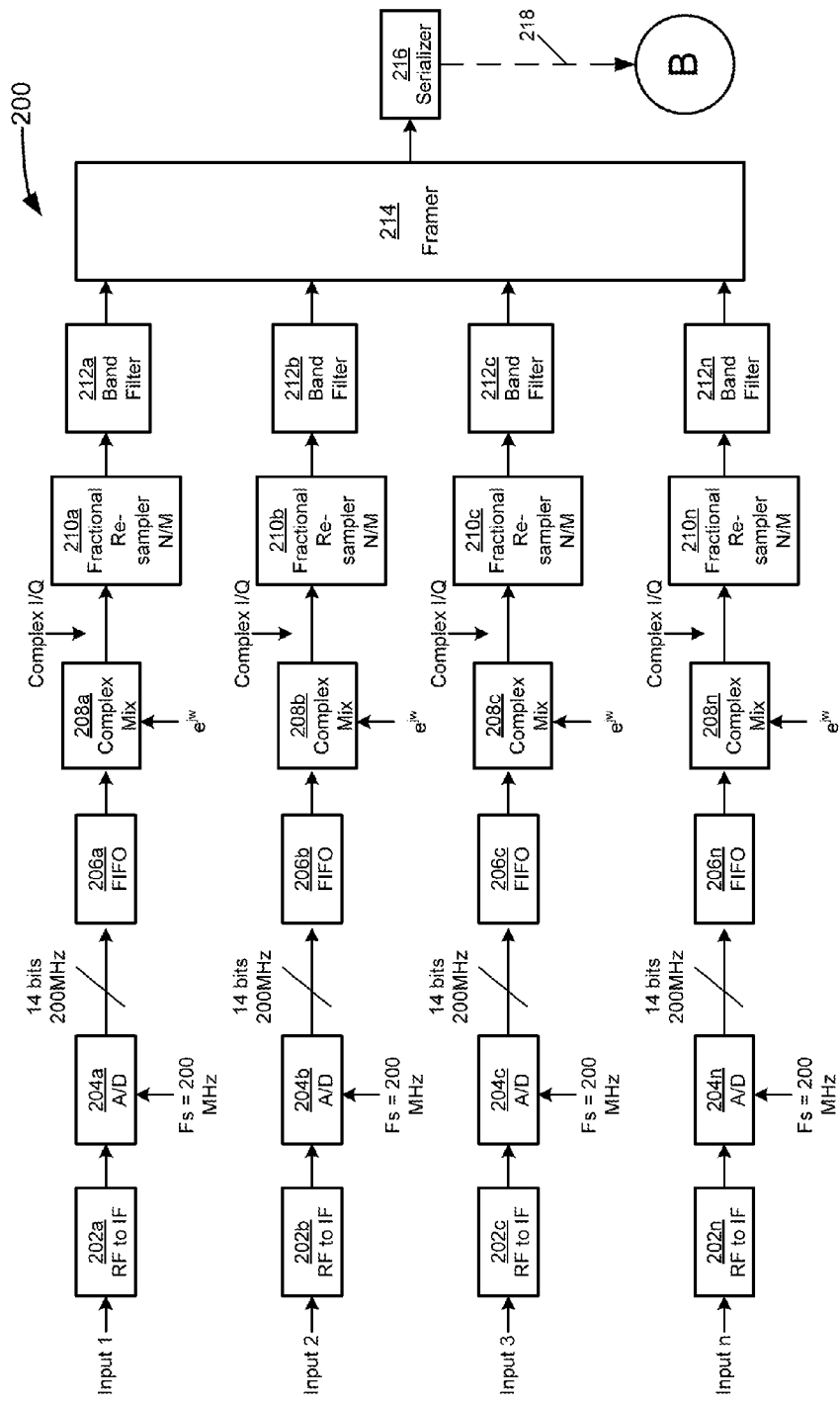
FIG. 3A is a block diagram of a master unit with re-sampling devices according to a second embodiment of the present invention.
Figure 3B:
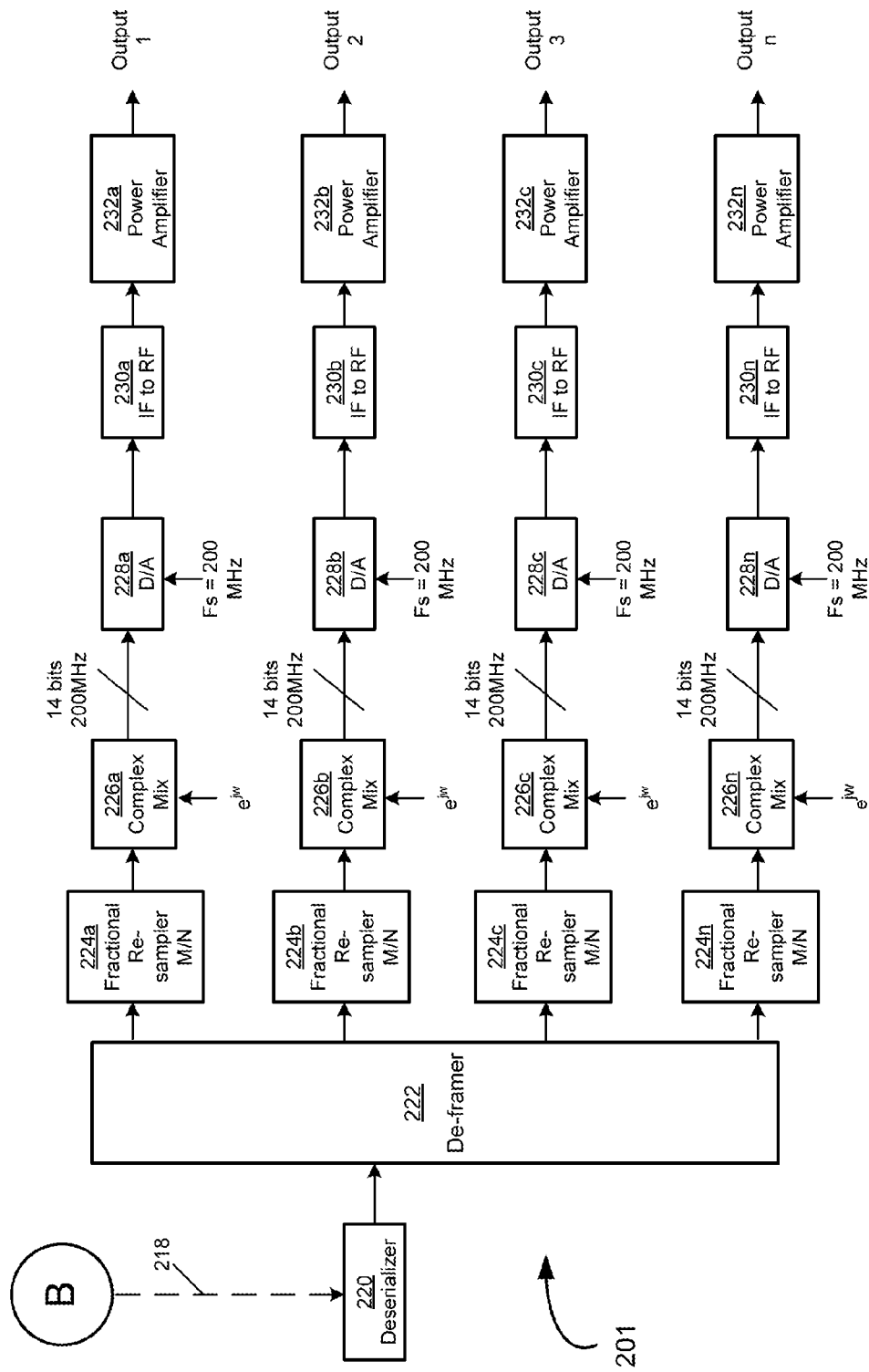
FIG. 3B is a block diagram of a remote unit having re-sampling devices and being capable of communicating with the master unit of FIG. 3A according to a second embodiment of the present invention.

FIGS. 3A-3B schematically depict a second embodiment for implementing a master unit 200 communicating with a remote unit 201 via a communication medium 218. As with the embodiments disclosed in FIGS. 1 and 2A-2B, a downlink path is shown and described, but various aspects can be applied to an uplink path from a remote unit 201 to a master unit 200 alternatively or in addition to the downlink path described.

The master unit 200 includes front-end components 202a-n, each capable of receiving an input signal from a carrier and down-converting the input signal from a radio frequency (RF) to an intermediate frequency (IF). The front-end components 202a-n can each include a low noise amplifier, mixer, and anti-aliasing filters to down-convert the input signal to the IF frequency and to prevent aliasing. The front-end components 202a-n may be configured to be generic such that the front-end components 202a-n are usable for different bands (e.g. AMPS, PCS, and AWS). Each input signal corresponds to a bandwidth and/or a bandwidth owned by the respective carrier. The input signals at IF can be converted to digital signals by A/D converters 204a-n. The A/D converters 204a-n shown in FIG. 3A use a sample rate of 200 MHz. Other sample rates can be used. The sample rate may be selected so that the same hardware can be used for any band. The output of the A/D converters 204a-n in FIG. 3A includes 14-bit digital signals at 200 MHz that are provided to first in, first out (FIFO) devices 206a-n. In some embodiments, the output of the A/D converters 204a-n are complex signals. The FIFO devices 206a-n can assist in ensuring proper timing in the system or otherwise queuing digital signals for further processing. The digital signals are provided to complex mixers 208a-n that are capable of outputting complex digital signals (e.g. signals representing both in-phase and quadrature components) that are at baseband. The embodiment shown in FIG. 3A can be implemented without complex mixers 208a-n, or with real mixers instead of complex mixers. In some embodiments, the master unit 200 can include a digital interface that receives previously sampled signals as input digital signals.

The complex digital signals are provided to re-sampling devices that are fractional re-samplers 210a-n. Each of the fractional re-samplers 210a-n is capable of re-sampling a complex digital signal according to a resample rate (N/M) that is selected based on factors such as the bandwidth of the corresponding input signal. The output of the fractional re-samplers 210a-n includes re-sampled complex digital signals. FIG. 4 includes a table that depicts examples of re-sample rates for N values of 1 to 15 for various carrier or input signal bandwidths. An example of M is 30.

As shown in the examples in the table of FIG. 4, the resample rate can be selected based on the carrier bandwidth such that lower resample rates can be used for lower bandwidths and such that the re-sampling rate is greater than or equal to the occupied bandwidth of the carrier signals, including a filter shape factor. The number of complex samples can be determined by dividing a frame period of a communication medium, (e.g. a serial link having a frame period of 1.2 µs, by a complex re-sampled sample period (1/resample rate). The number of octets per sample can be determined by dividing the number of bits required by eight. The number of octets of data to be included in a frame is an integer number that depends on the resample rate and the number of octets per sample such that lower carrier bandwidth signals consume fewer octets for a frame. The number of octets can be determined by multiplying the number of complex samples by the number of octets per sample and by two. Multiplying by two can account for complex signals that include an I and Q term for each sample. In some embodiments, and as reflected in the table in FIG. 4, lower values of N correspond to more required bits to account for narrower re-sampling that filters more noise. The additional bits (in this example two additional bits, although one additional bit can be sufficient for some bandwidths) are included to represent the signal so that the noise voltage traverses enough quantization levels to stay in the linear region of A/D converters when no signal is present. For example, if too much noise (e.g. a percentage greater than a certain threshold) is filtered out of the signal and no signal is present, the noise may not traverse more than one quantization level and the system is muted. The additional bit or bits can prevent such muting. In some implementations, when the noise is reduced by a factor of one-fourth, another bit is added. For example, reducing from 80 MHz to 20 MHz may involve adding a bit and reducing from 20 MHz to 5 MHz may involve adding a bit. Each bit can represent a 6 dB increase in dynamic range.

The re-sampled signals are provided to band filters 212a-n in FIG. 3A for filtering to ensure a desired band is passed. For example, a band filter can be configured to pass signals from one carrier (the carrier providing the input signals for which the band filter is processing the corresponding digital signals), but not from another carrier. The band filters 212a-n may also increase downlink to uplink isolation. The bandwidth of each of the band filters 212a-n may depend on the bandwidth of the respective input signals. For example, the bandwidth of band filter 212a can depend on the bandwidth of the input signal 1 and the bandwidth of band filter 212b can depend on the bandwidth of the input signal 2. The framer 214 can multiplex the re-sampled and filtered digital signals and generate a frame having the re-sampled and filtered digital signals disposed therein.

Figure 5:
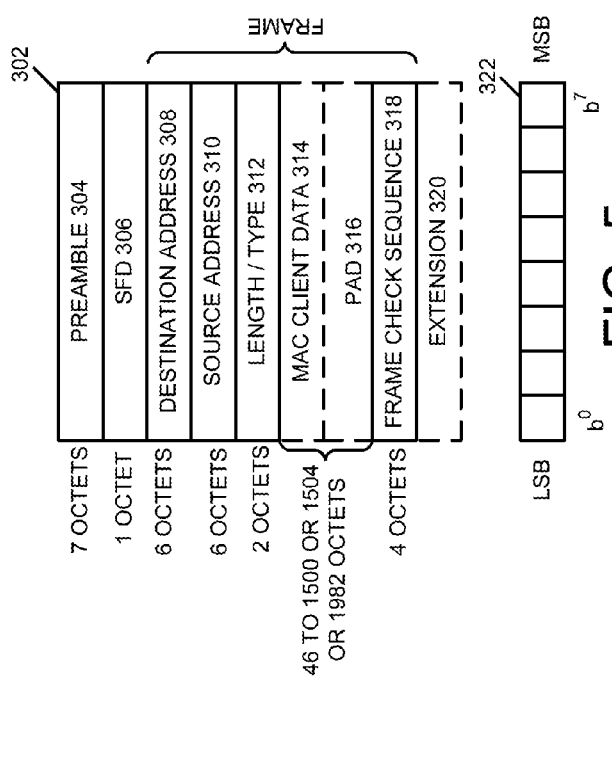
FIG. 5 depicts a frame structure according to one embodiment of the present invention.

FIG. 5 depicts an example of a frame structure that framer 214 can be configured to use. The frame structure in FIG. 5 is an Ethernet frame structure usable in a system implementing the IEEE 802.3 standard. Other types of frame structures, such as SONET, CPRI, and OBSAI, however, can be used. The Ethernet frame structure uses a frame length of 1500 octets, but other lengths can be used. The Ethernet frame structure includes a packet 302 that includes a preamble 304 corresponding to seven octets, a start frame delimiter (SFD) 306 corresponding to one octet, a frame, and an extension 320.

The frame includes a destination address 308 corresponding to six octets, a source address 310 corresponding to six octets, length/type corresponding to two octets, MAC client data 314, packet assembler/disassembler (PAD) 316, and a frame check sequence 318 corresponding to four octets. The MAC client data 314 and PAD 316 can correspond to 46 to 1500 or 1504, or 1982 octets, depending on the payload size and frame length.

The octets in the fields can be transmitted in order from top to bottom in the frame structure depicted in FIG. 5. FIG. 5 also depicts a bit structure 322 for the fields from which bits are transmitted from left to right (i.e. from the length significant bit (LSB) to the most significant bit (MSB)).

A table in FIG. 6 lists the fields of the frame structure and corresponding octets, including the available octets for payload data. In this example, the number of octets available for payload data is 1297 octets if the link in an installation includes a 1 Gb link and control data. If not included, the number of octets available for payload data is 1447. An example of a frame rate for the data in the table of FIG. 6 is 833333.333 Hz and an example frame duration is 1.2 µs.

Figure 7:
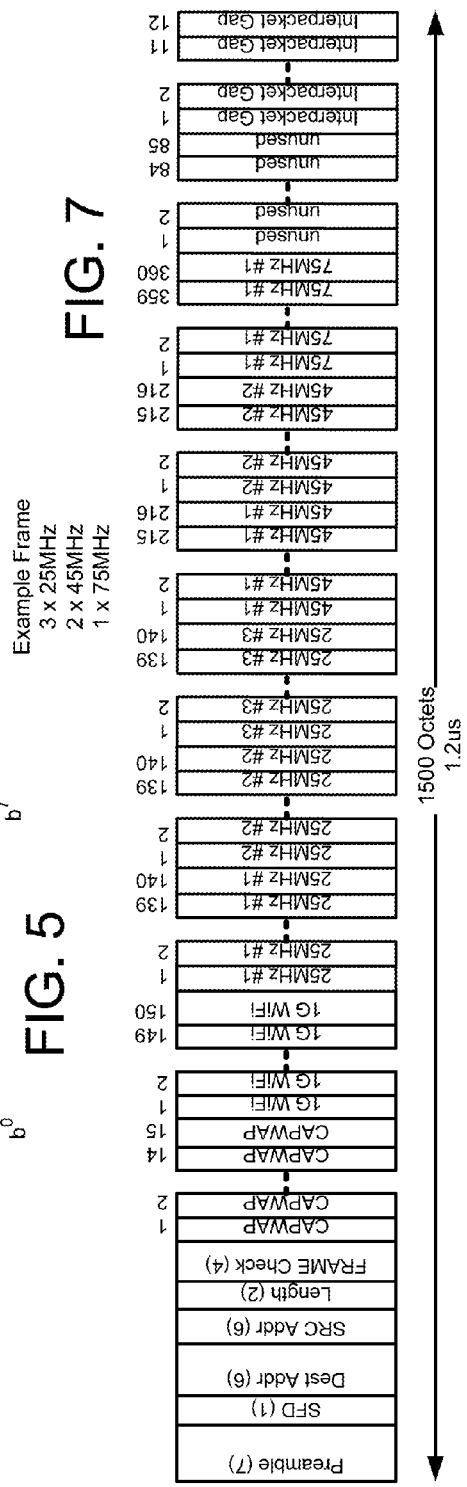
FIG. 7 depicts a frame structure having payload that includes signals from six bands according to one embodiment of the present invention.

FIG. 7 depicts an example frame structure in which six bands of signals: three at 25 MHz, two at 45 MHz, and one at 75 MHz are disposed. More or less bands, however, can be used. Each of the 25 MHz bands consumes 140 octets in the frame. Each of the 45 MHz bands consumes 216 octets in the frame. The 75 MHz band consumes 360 octets. The total payload consumes 1212 octets. By re-sampling the digital signals using customized resample rates, the number of octets consumed by six bands, for example, is reduced.

Returning to FIG. 3A, a serializer 216 outputs the frame as serial data to communication medium 218 that transports the serial data as shown via the circled B to the remote unit 201 depicted in FIG. 3B. The remote unit 201 in FIG. 3B includes a deserializer 220 that converts the serial data to frame data and provides the frame data to de-framer 222. In some embodiments, a jitter buffer is between the deserializer 220 and the de-framer 222, such as for asynchronous transport. The de-framer 222 extracts the re-sampled digital signals according to the defined frame structure and provides each re-sampled digital signals to the appropriate one of the re-sampling devices that are shown as fractional re-sampler M/N 224a-n. These devices can use the reciprocal of the corresponding resample rates to output complex digital signals at 200 MHz. Complex mixers 226a-n can remove the complex components of the digital signals and provide digital signals at 14 bits to D/A converters 228a-n. The D/A converters can use a sample rate of 200 MHz to convert the digital signals to analog data at an intermediate frequency with which back-end components 230a-n can convert it to an appropriate frequency for amplification by power amplifiers 232a-n and transmission to remote devices. The embodiment in FIG. 3B can be implemented without complex mixers 226a-n or with real mixers instead of complex mixers 226a-n.

Re-sampling devices according to various embodiments of the present invention can be packaged using various configurations. In some embodiments, the re-sampling devices are modular components that are each packaged separately from other components in a system. In other embodiments, the re-sampling devices are each packaged in an integrated device with one or more other components, respectively.

FIG. 8A depicts an integrated device 402 that includes an A/D converter 404, a frequency conversion device that is a complex mixer 406, and a re-sampling device that is a fractional re-sampler N/M 408 in one integrated package. In other embodiments, the integrated package includes the complex mixer 406 (or other type of frequency conversion device) and the fractional re-sampler N/M 408, but not the A/D converter 404. For example, the integrated package may be used with a digital interface for which an A/D converter is not used. FIG. 8B depicts a second integrated device 412 that includes a re-sampling device that is a fractional re-sampler M/N 414, a frequency conversion device that is a complex mixer 416, and a D/A converter 418 in one integrated package. In other embodiments, the integrated package includes the fractional re-sampler M/N 414 and the complex mixer 416 (or other type of frequency conversion device), but not the D/A converter 418.

The foregoing description of the embodiments, including illustrated embodiments, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention.

What is claimed is:

1. A distributed antenna system comprising:
a master unit comprising:
re-sampling devices configured to output re-sampled digital downlink signals by re-sampling digital downlink signals at customized resample rates based on at least one factor, the re-sampled digital downlink signals having a smaller bandwidth than the digital downlink signals; and
a framer configured to multiplex the re-sampled digital downlink signals and to generate a first frame that includes the re-sampled digital downlink signals as framed data for transport to one or more remote units of the distributed antenna system, wherein the one or more remote units of the distributed antenna system are configured to transmit radio frequency signals using at least one antenna, wherein the transmitted radio frequency signals are derived from the framed data of the first frame received from the master unit.

2. The distributed antenna system of claim 1, wherein the digital downlink signals are received from one or more telecommunication network operators.

3. The distributed antenna system of claim 1, wherein the first frame contains more information as compared to a second frame containing the digital downlink signals and that is a same size as the first frame.

4. The distributed antenna system of claim 1, wherein the customized resample rates include a first resample rate and a second resample rate that is at a different rate than the first resample rate.

5. The distributed antenna system of claim 1, further comprising:
a serializer configured to serialize the framed data; and
a transmitter configured to output serialized framed data from the serializer on a communication medium for receipt by the one or more remote units.

6. The distributed antenna system of claim 1, wherein the first frame is an Ethernet frame comprising a preamble, a start frame delimiter, a destination address, a source address, length or type, MAC client data, packet assembler/disassembler, a frame check sequence, and an extension.

7. The distributed antenna system of claim 1, further comprising:
the one or more remote units associated with antennas and configured to provide wireless coverage in an area, at least one remote unit of the one or more remote units comprising:
a de-framer configured to extract the re-sampled digital downlink signals;
remote unit re-sampling devices configured to re-sample the digital downlink signals to produce remote unit digital downlink signals at a remote unit resample rate that is higher than the customized resample rates; and
a digital-to-analog converter configured to produce the downlink radio frequency signals from the remote unit digital downlink signals.

8. The distributed antenna system of claim 1, wherein the at least one factor includes a bandwidth owned by a telecommunication network operator that is a source of the downlink radio frequency signals.

9. The distributed antenna system of claim 1, wherein the at least one factor includes the bandwidth of a communication medium between the master unit and the one or more remote units.

10. The distributed antenna system of claim 1, wherein the at least one factor includes the bandwidth of the downlink radio frequency signals.

11. A distributed antenna system comprising:
a master unit comprising:
a de-framer configured to extract re-sampled digital uplink signals from a first frame that includes the re-sampled digital uplink signals as framed data received from one or more remote units of the distributed antenna system, wherein the one or more remote units of the distributed antenna system are configured to receive radio frequency signals using at least one antenna, to generate the framed data of the first frame based on the radio frequency signals, and to transmit the first frame to the master unit;
re-sampling devices configured to output digital uplink signals by re-sampling the re-sampled digital uplink signals from customized resample rates to a sample rate based on at least one factor, the re-sampled digital uplink signals having a smaller bandwidth than the digital uplink signals.

12. The distributed antenna system of claim 11, wherein the digital uplink signals are transmitted to one or more telecommunication network operators.

13. The distributed antenna system of claim 11, wherein the first frame contains more information as compared to a second frame containing the digital uplink signals and that is a same size as the first frame.

14. The distributed antenna system of claim 11, wherein the customized resample rates include a first resample rate and a second resample rate that is at a different rate than the first resample rate.

15. The distributed antenna system of claim 11, further comprising:
a receiver configured to receive serialized framed data from the one or more remote units through a communication medium; and
a deserializer configured to deserialize the serialized framed data.

16. The distributed antenna system of claim 11, wherein the first frame is an Ethernet frame comprising a preamble, a start frame delimiter, a destination address, a source address, length or type, MAC client data, packet assembler/dissembler, a frame check sequence, and an extension.

17. The distributed antenna system of claim 11, further comprising:
the one or more remote units associated with antennas and configured to provide wireless coverage in an area, at least one remote unit of the one or more remote units comprising:
an analog-to-digital converter configured to produce the remote unit digital uplink signals from the uplink radio frequency signals;
remote unit re-sampling device configured to re-sample the remote unit digital uplink signals to the customized resample rates from a remote unit resample rate that is higher than the customized resample rates to produce the digital uplink signals; and
a framer configured to generate the digital uplink signals.

18. The distributed antenna system of claim 11, wherein the at least one factor includes the bandwidth of a communication medium between the master unit and the one or more remote units.

19. The distributed antenna system of claim 11, wherein the at least one factor includes the bandwidth of the uplink radio frequency signals.

20. A method, comprising:
re-sampling the digital downlink signals at the master unit at customized resample rates that are based on at least one factor to output re-sampled digital downlink signals, the re-sampled digital downlink signals having a smaller bandwidth than the digital downlink signals;
multiplexing the re-sampled digital downlink signals at the master unit;
generating a frame at the master unit, the frame including the re-sampled digital downlink signals as framed data for transport to one or more remote units to provide wireless coverage in an area;
transporting the frame including the framed data to the one or more remote units from the master unit;
deriving radio frequency signals from the framed data of the first frame at the one or more remote units; and
transmitting the derived radio frequency signals using at least one antenna at the one or more remote units.

* * * * *